(12) United States Patent
Farkas et al.

(10) Patent No.: US 8,790,763 B2
(45) Date of Patent: Jul. 29, 2014

(54) THERMOPLASTIC POLYURETHANE WITH REDUCED TENDENCY TO BLOOM

(75) Inventors: Julius Farkas, North Ridgeville, OH (US); Charles P. Jacobs, Elyria, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 671 days.

(21) Appl. No.: 12/712,329

(22) Filed: Feb. 25, 2010

(65) Prior Publication Data

US 2010/0239803 A1    Sep. 23, 2010

Related U.S. Application Data

(60) Provisional application No. 61/161,162, filed on Mar. 18, 2009.

(51) Int. Cl.
*B32B 1/08* (2006.01)
*C08G 18/00* (2006.01)

(52) U.S. Cl.
USPC ........ 428/36.9; 528/84; 264/328.16; 264/319

(58) Field of Classification Search
CPC ........... B32B 1/08; C08G 18/00; B29C 45/73
See application file for complete search history.

(56) References Cited

U.S. PATENT DOCUMENTS

| 4,367,302 A * | 1/1983 | Le Roy et al. ............... 524/104 |
| 4,400,498 A * | 8/1983 | Konishi et al. ................ 528/60 |
| 5,491,211 A | 2/1996 | Rieck et al. |
| 5,606,005 A | 2/1997 | Oshita et al. |
| 5,959,059 A | 9/1999 | Vedula et al. |
| 6,054,533 A * | 4/2000 | Farkas et al. ................. 525/90 |
| 6,200,338 B1 * | 3/2001 | Solomon et al. ............ 623/1.34 |
| 6,849,667 B2 | 2/2005 | Haseyama et al. |
| 2006/0108708 A1 * | 5/2006 | Wakita et al. ................. 264/248 |
| 2008/0139774 A1 | 6/2008 | Lawrey et al. |
| 2009/0264614 A1 | 10/2009 | Hayashi et al. |

FOREIGN PATENT DOCUMENTS

| EP | 0748829 A1 | 12/1996 |
| EP | 1932863 A2 | 6/2008 |
| JP | 8-183831 A | 7/1996 |
| JP | 9-20863 A | 1/1997 |
| JP | 2002-201301 A | 7/2002 |
| JP | 2005-248097 A | 9/2005 |
| WO | 2007/029382 A1 | 3/2007 |
| WO | 2010/031792 A1 | 3/2010 |

* cited by examiner

*Primary Examiner* — Randy Gulakowski
*Assistant Examiner* — Jeffrey Washville
(74) *Attorney, Agent, or Firm* — Thoburn T. Dunlap

(57) ABSTRACT

The present invention discloses a thermoplastic polyurethane which is comprised of the reaction product of (1) a hydroxyl terminated polyester intermediate, (2) a polyisocyanate, and (3) a glycol chain extender; wherein the hydroxyl terminated polyester intermediate is comprised of repeat units that are derived from 1,3-propylene glycol and a dicarboxylic acid; wherein the hydroxyl terminated polyester intermediate has a number average molecular weight from 500 to 10,000; and wherein the thermoplastic polyurethane includes hard segments that are the reaction product of the polyisocyanate and the glycol chain extender. This thermoplastic polyurethane is unique in that it has a greatly reduced tendency to bloom. This is highly desirable in applications where high clarity is desired because blooming causes articles containing the thermoplastic polyurethane to be hazy or foggy in appearance. Blooming can also reduce the ability of an article made with the thermoplastic polyurethane to be securely bound to another article with an adhesive.

1 Claim, No Drawings

THERMOPLASTIC POLYURETHANE WITH REDUCED TENDENCY TO BLOOM

CROSS REFERENCE TO RELATED APPLICATION

This application claims priority from Provisional Application Ser. No. 61/161,162 filed on Mar. 18, 2009.

FIELD OF THE INVENTION

The present invention relates to thermoplastic polyurethanes (TPUs) that offer reduced blooming characteristics. These thermoplastic polyurethane are comprised of the reaction product of (1) a hydroxyl terminated polyester intermediate, (2) a polyisocyanate, and (3) a glycol chain extender; wherein the hydroxyl terminated polyester intermediate is comprised of repeat units that are derived from 1,3-propylene glycol and a dicarboxylic acid; wherein the hydroxyl terminated polyester intermediate has a number average molecular weight which is within the range of 500 to 10,000 Daltons; and wherein the thermoplastic polyurethane includes hard segments that are the reaction product of the polyisocyanate and the glycol chain extender.

BACKGROUND OF THE INVENTION

TPU polymers are typically made by reacting (1) a hydroxyl terminated polyether or hydroxyl terminated polyester, (2) a chain extender, and (3) an isocyanate compound. Various types of compounds for each of the three reactants are disclosed in the literature. The TPU polymers made from these three reactants find use in various fields where products are made by melt processing the TPU and forming it into various shapes to produce desired articles by processes such as extrusion and molding.

TPUs are segmented polymers having soft segments and hard segments. This feature accounts for their excellent elastic properties. The soft segments are derived from the hydroxyl terminated polyether or polyester and the hard segments are derived from the isocyanate and the chain extender. The chain extender is typically one of a variety of glycols, such as 1,4-butane glycol.

U.S. Pat. No. 5,959,059 discloses a TPU made from a hydroxyl terminated polyether, a glycol chain extender, and a diisocyanate. This TPU is described as being useful for making fibers, golf ball cores, recreational wheels, and other uses.

Blooming is a problem that is frequently observed in articles made with thermoplastic polyurethanes. Blooming is something also referred to as "surface haze" or "surface fogging." Blooming is undesirable because it can destroy the aesthetic surface characteristics of articles made with polymers that bloom. It is particularly undesirable for bloom to occur in articles where clarity is desired. Bloom is also undesirable because it can reduce the ability of an article made with the blooming polymer to be securely bound to other article with adhesives. Blooming has long been recognized as serious problem in some applications and an effective means for alleviating it as been sought for years.

U.S. Pat. No. 5,491,211 discloses a thermoplastic polyurethane composition that is reported to be bloom-free. This objective is reported to be accomplished by including a monofunctional compound that is reactive with isocyanates in the thermoplastic polyurethane composition. U.S. Pat. No. 5,491,211 specifically discloses the use of monofunctional alcohols that contain at least 14 carbon atoms, such as 1-tetradecanol, 1-octadecanol, or 1-docosanol, for the purpose of controlling bloom.

SUMMARY OF THE INVENTION

The subject invention relates to a thermoplastic polyurethane that has a greatly reduced tendency to bloom. Reducing the tendency of a polymer to bloom is highly desirable in applications where high clarity is desired because blooming causes articles made with polymers that bloom to be hazy or foggy in appearance. Blooming can also reduce the ability of an article made with the polymer that blooms to be securely bound to another article with an adhesive.

The present invention discloses a thermoplastic polyurethane which is comprised of the reaction product of (1) a hydroxyl terminated polyester intermediate, (2) a polyisocyanate, and (3) a glycol chain extender; wherein the hydroxyl terminated polyester intermediate is comprised of repeat units that are derived from 1,3-propylene glycol and a dicarboxylic acid; wherein the hydroxyl terminated polyester intermediate has a number average molecular weight which is within the range of 500 to 10,000 Daltons; and wherein the thermoplastic polyurethane includes hard segments that are the reaction product of the polyisocyanate and the glycol chain extender. The thermoplastic polyurethane compositions of this invention do not require a monofunctional compound that is reactive with isocyanates, such as monofunctional alkylene alcohols having at least 14 carbon atoms, to control bloom.

The present invention further discloses a process for manufacturing a molded article which comprises (a) heating a thermoplastic polyurethane composition to a temperature which is above the melting point of the thermoplastic polyurethane composition, wherein the thermoplastic polyurethane composition is the reaction product of (1) a hydroxyl terminated polyester intermediate, (2) a polyisocyanate, and (3) a glycol chain extender; wherein the hydroxyl terminated polyester intermediate is comprised of repeat units that are derived from 1,3-propylene glycol and a dicarboxylic acid; wherein the hydroxyl terminated polyester intermediate has a number average molecular weight which is within the range of 500 to 10,000 Daltons; and wherein the thermoplastic polyurethane includes hard segments that are the reaction product of the polyisocyanate and the glycol chain extender; (b) injecting the thermoplastic polyurethane composition into a mold; (c) cooling the thermoplastic polyurethane composition in the mold to a temperature which is below the melting point of the thermoplastic polyurethane composition to produce the molded article; and (d) removing the molded article from the mold.

The present invention further discloses a process for manufacturing extruded articles, such as fibers, sheets, films, tubes and hoses, which comprises (a) heating a thermoplastic polyurethane composition to a temperature which is above the melting point of the thermoplastic polyurethane composition, wherein the thermoplastic polyurethane composition is the reaction product of (1) a hydroxyl terminated polyester intermediate, (2) a polyisocyanate, and (3) a glycol chain extender; wherein the hydroxyl terminated polyester intermediate is comprised of repeat units that are derived from 1,3-propylene glycol and a dicarboxylic acid; wherein the hydroxyl terminated polyester intermediate has a number average molecular weight which is within the range of 500 to 10,000 Daltons; and wherein the thermoplastic polyurethane includes hard segments that are the reaction product of the polyisocyanate and the glycol chain extender; (b) extruding the thermoplastic polyurethane composition into the desired shape of the extruded article; and (c) cooling the thermoplastic polyurethane composition to a temperature which is below the melting point of the thermoplastic polyurethane composition to produce the extruded article. Such an extrusion process is of particular value in manufacturing clear tubes and hoses for conveying vegetable oils, other edible liquids, and other organic liquids. The extrusion process can be a profile extrusion process.

In another embodiment of this invention the thermoplastic polyurethane composition can be blow molded into a desired article of manufacture. For instance, the polyurethane composition can be blow molded into clear bottles.

In another embodiment of this invention a shoe having an upper and a sole is disclosed. In this shoe the sole is comprised of a thermoplastic polyurethane composition which is the reaction product of (1) a hydroxyl terminated polyester intermediate, (2) a polyisocyanate, and (3) a glycol chain extender; wherein the hydroxyl terminated polyester intermediate is comprised of repeat units that are derived from 1,3-propylene glycol and a dicarboxylic acid; wherein the hydroxyl terminated polyester intermediate has a number average molecular weight which is within the range of 500 to 10,000 Daltons; and wherein the thermoplastic polyurethane includes hard segments that are the reaction product of the polyisocyanate and the glycol chain extender.

DETAILED DESCRIPTION OF THE INVENTION

The thermoplastic polyurethane of this invention is the reaction product of (1) a hydroxyl terminated polyester intermediate, (2) a polyisocyanate, and (3) a glycol chain extender. The technique under which these reactants are polymerized to synthesize the thermoplastic polyurethane is conducted utilizing conventional equipment, catalysts, and procedures. However, it is important for the hydroxyl terminated polyester intermediate to be comprised of repeat units that are derived from 1,3-propylene glycol and a dicarboxylic acid. The hydroxyl terminated polyester intermediate will also typically have a number average molecular weight which is within the range of 500 to 10,000 Daltons.

The hydroxyl terminated intermediate used in making the thermoplastic polyurethane is a hydroxyl terminated polyester intermediate that is comprised of repeat units that are derived from 1,3-propane glycol and a dicarboxylic acid. The 1,3-propane glycol will represent at least 70 weight percent of the glycol component used in synthesizing the hydroxyl terminated polyester intermediate. Typically, the 1,3-propane glycol will represent at least 80 eight percent of the glycol component used in synthesizing the hydroxyl terminated polyester intermediate and will preferably represent at least 90 weight percent of the glycol component. It is normally more preferred for the 1,3-propane glycol to represent at least 95 weight percent of the glycol component used in synthesizing the hydroxyl terminated polyester intermediate.

The dicarboxylic acids used in making the hydroxyl terminated polyester intermediate can be aliphatic, cycloaliphatic, aromatic, or combinations thereof. Suitable dicarboxylic acids which may be used alone or in mixtures generally have a total of from 4 to 15 carbon atoms and include: succinic acid, glutaric acid, adipic acid, pimelic acid, suberic acid, azelaic acid, sebacic acid, dodecanedioic acid, phthalic acid, isophthalic acid, terephthalic acid, 2,6-naphthalene dicarboxylic acid, cyclohexane dicarboxylic acid, and the like. The dicarboxylic acid used will typically be of the formula: $HOOC(CH_2)_nCOOH$, wherein n represents an integer within the range of 2 to 10, preferably from 4 to 8, and most preferably 4-7. Adipic acid is a preferred acid. Anhydrides of the above dicarboxylic acids, such as phthalic anhydride, tetrahydrophthalic anhydride, or the like, can also be used to synthesize the intermediate by a transesterification reaction.

The hydroxyl terminated polyester intermediate used in making the thermoplastic polyurethanes of this invention will typically have a number average molecular weight (Mn), as determined by assay of the terminal functional groups, which is within the range of about 500 to about 10,000 Daltons, typically about 750 to about 4,000 Daltons, desirably from about 1000 to about 3,000 Daltons, most preferably from about 1000 to about 2,500 Daltons. A blend of two or more hydroxyl terminated polyester intermediates may be used to make the TPU of this invention.

The glycol chain extender used in making the thermoplastic polyurethane of this invention is either ethylene glycol, propylene glycol or a mixture thereof. The glycol chain extender can also include 1,4-butane glycol, 1,5-pentane diol, 1,6-hexane diol, and hydroquinone his (2-hydroxyethyl)ether (HQEE). It is highly preferred to utilize only 1,3-propane diol and/or 1,4-butane diol as the chain extender.

The polyisocyanate used in synthesizing the thermoplastic polyurethane is preferably a diisocyanate. While aliphatic diisocyanates can be utilized, aromatic diisocyanates are highly preferred. Moreover, the use of multifunctional isocyanate compounds, i.e., triisocyanates, etc., which cause crosslinking, are generally avoided and thus the amount used, if any, is generally less than 4 mole percent and preferably less than 2 mole percent based upon the total moles of all of the various isocyanates used. Suitable diisocyanates include aromatic diisocyanates, such as, 4,4'-methylenebis-(phenyl isocyanate) (MDI), 2,4'-methylenebis-(phenyl isocyanate), m-xylylene diisocyanate (XDI), m-tetramethyl xylylene diisocyanate (TMXDI), phenylene-1,4-diisocyanate (PPDI), 1,5-naphthalene diisocyanate (NDI), diphenylmethane-3,3'-dimethoxy-4,4'-diisocyanate (TODI), and toluene diisocyanate (TDI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,3-bis(isocyanato-methyl)cyclohexane (HXDI), 1,6-hexane diisocyanate (HDI), 1,10-decane diisocyanate, and trans-dicyclohexylmethane diisocyanate (HMDI). A commonly used diisocyanate is 4,4'-methylenebis(phenyl isocyanate) (MDI). Dimers and trimers of the above diisocyanates may also be used as well as a blend of two or more diisocyanates may be used.

The polyisocyanate used in this invention may be in the form of a low molecular weight polymer or oligomer which is end capped with an isocyanate. For example, the hydroxyl terminated polyester intermediate described above may be reacted with an isocyanate-containing compound to create a low molecular weight polymer end capped with isocyanate. In the TPU art, such materials are normally referred to as pre-polymers. Such pre-polymers normally have a number average molecular weight (Mn) which is within the range of about 500 to about 10,000 Daltons.

The mole ratio of the one or more diisocyanates is generally from about 0.95 to about 1.05, and preferably from about 0.98 to about 1.03 moles per mole of the total moles of the one or more hydroxyl terminated polyester intermediates and the one or more chain extenders.

The process to produce the TPU polymer of this invention can utilize conventional TPU manufacturing equipment. The hydroxyl terminated polyester intermediate, the diisocyanate, and the chain extender, as noted above, are generally added together and reacted in accordance with any conventional urethane reaction method. Preferably, the TPU forming components of the present invention are melt polymerized in a suitable mixer, such as an internal mixer known as a Banbury mixer, or preferably an extruder. In the preferred process, the hydroxyl terminated polyester intermediate is blended with the glycol chain extender and added to the extruder as a blend. The diisocyanate is added separately to the extruder. Suitable processing or polymerization starting temperatures of the diisocyanate is from about 100° C. to about 200° C., and preferably from about 100° C. to about 150° C. Suitable processing or polymerization starting temperatures of the blend of the hydroxyl terminated polyester intermediate and the chain extender is from about 100° C. to about 220° C., and preferably from about 150° C. to 200° C. Suitable mixing times in order to enable the various components to react and form the TPU polymers of the present invention are generally from about 2 to about 10 minutes, and preferably from about 3 to about 5 minutes.

The preferred process to produce the TPU of this invention is the process referred to as the one-shot polymerization process. In the one-shot polymerization process which generally occurs in situ, a simultaneous reaction occurs between three components, that is the one or more hydroxyl terminated polyester intermediates, the glycol, and the diisocyanate. The reaction is generally initiated at a temperature of from about 90° C. to about 120° C. Inasmuch as the reaction is exothermic, the reaction temperature generally increases to about 220° C. to 250° C. In cases where ethylene glycol is used as the chain extender, it is important to limit the temperature of this exothermic reaction to a maximum of 235° C. to prevent undesired levels of foam formation. The TPU polymer will exit the reaction extruder and be pelletized. The pellets of TPU are normally stored in a heated vessel to continue the reaction and to dry the TPU pellets.

It is often desirable to utilize catalysts such as stannous and other metal carboxylates as well as tertiary amines. Examples of metal carboxylates catalysts include stannous octoate, dibutyl tin dilaurate, phenyl mercuric propionate, lead octoate, iron acetylacetonate, magnesium acetylacetonate, and the like. Examples of tertiary amine catalysts include triethylene diamine, and the like. The amount of the one or more catalysts is low, generally from about 50 to about 100 parts by weight per million parts by weight of the end TPU polymer formed.

The weight average molecular weight (Mw) of the TPU polymer of the present invention range from about 90,000 to about 600,000 Daltons, preferably from about 100,000 to about 300,000 Daltons, and more preferably from about 120,000 to about 250,000 Daltons. The Mw of the TPU polymer is measured according to gel permeation chromatography (GPC) against polystyrene standard.

When a higher molecular weight TPU polymer is desired, it can be achieved by using a small amount of a cross linking agent having an average functionality greater than 2.0 to induce cross linking. The amount of cross linking agent used is preferably less than 2 mole percent of the total moles of chain extender, and more preferably less than 1 mole percent. A particularly desirable method to increase the molecular weight in the preferred TPU polymer is to replace less than 1 mole percent of the chain extender with trimethylol propane (TMP).

The cross linking is accomplished by adding a cross linking agent having an average functionality greater than 2.0 together with the hydroxyl terminated intermediate, the isocyanate compound, and chain extender in the reaction mixture to manufacture the TPU polymer. The amount of cross linking agent used in the reaction mixture to make the TPU polymer will depend on the desired molecular weight and the effectiveness of the particular cross linking agent used. Usually, less than 2.0 mole percent, and preferably less than 1.0 mole percent, based on the total moles of chain extender used in making the TPU polymer are used. Levels of cross linking agent greater than 2.0 mole percent, based on the total moles of chain extender would be difficult to melt process. Therefore, the level of cross linking agent used is from about 0.05 mole percent to about 2.0 mole percent based on the total moles of hydroxyl components.

The cross linking agents can be any monomeric or oligomeric materials which have an average functionality of greater than 2.0 and have the ability to cross link the TPU polymer. Such materials are well known in the art of thermoset polyurethanes. Preferred cross linking agents include trimethylol propane (TMP) and pentaerythritol. Trimethylol propane has been found to particularly be a desirable cross linking agent.

The TPU polymers of the present invention can be mixed with various conventional additives or compounding agents, such as fillers, extenders, pigments, lubricants, UV absorbers, and the like. However, the TPUs of this invention are normally free of plasticizers. Fillers that can be used include talc, silicates, clays, calcium carbonate, and the like. The level of conventional additives will depend on the final properties and cost of the desired end-use application, as is well known to those skilled in the art of compounding TPUs. The additives may be added during the reaction to form the TPU, but are normally added in a second compounding step.

The TPU polymer of this invention has a high melting point of at least about 170° C., preferably at least about 185° C., and most preferably at least about 200° C. The TPUs of this invention will typically have a melt point which is within the range of 170° C. to 240° C., and will more typically have a melting point which is within the range of 185° C. to 220° C. The TPUs of this invention will preferably have a melting point which is within the range of 200° C. to 220° C. A high melting point is important in applications using melt spun fibers with other synthetic fibers, such as polyester. Certain melt coating applications also require a high melting point TPU to withstand the manufacturing process, especially those applications which require the use of fluorinated polymers. The melting point of the TPU polymer can be measured according to ASTM D-3417-99 using a differential scanning calorimeter (DSC). However, in the case of very soft polymers the Kopfler method can be used to measure the melting point of the TPU.

The hardness of the TPU polymers of this invention can range from being extremely soft (Shore A hardness of about 20) to relatively hard (Shore D hardness of about 80) as measured in accordance with ASTM D2240. The TPU polymers of this invention will typically have a Shore A hardness which is within the range of 30 to 70 and will more typically have a Shore A hardness which is within the range of 35 to 60. The TPU can be made softer by including a plasticizer, such as a phthalate plasticizer in the TPU composition. However, care should be taken to preclude the use of plasticizers that compromise clarity in applications where it is desirable for the product to be clear.

Other conventional additives can be included in the TPU compositions of this invention. Among these other conventional additives are, for example, antioxidants, antiozone agents, antihydrolysis agents, extrusion aids, UV stabilizers, chain terminators, light stabilizers, colorants, and flame retardants. These additives and their use in polyurethane compositions are generally known. Typically, these additives are used in amounts that achieve a desired effect. Excessive amounts of additives may reduce other properties of the polyurethane composition beyond desired limits.

Antioxidants typically prevent or terminate oxidation reactions that result in degradation of the polyurethane article over the lifetime of the article. Typical antioxidants include ketones, aldehydes, and aryl amines, as well as phenolic compounds. Specific examples of compounds include ethylenebis(oxyethylene)bis(3-t-butyl-4-hydroxy-5-methylcinnamate and tetrakis[methylene(3,5-di-t-butyl-4-hydroxyhydrocinnamate)]methane. Examples of suitable commercial antioxidants include Irganox 1010, Irganox 1098, Irganox 565, and Irganox 1035 (Ciba-Geigy Corp., Ardsley, N.Y.).

Antiozone agents prevent or reduce damage caused by ozone and antihydrolysis agents prevent or reduce damage by water and other hydrolyzing compounds. Examples of suitable antiozonants include p-phenylenediamine derivatives. Antihydrolysis agents include, for example, Stabaxol P and Stabaxol P-200 (Rhein Chemie, Trenton, N.J.).

Extrusion aids facilitate movement of the polyurethane through the extruder. Waxes, such as Wax E (Hoechst-Celanese Corp., Chatham, N.J.), Acrawax (Lonza Inc., Fair Lawn, N.J.) and oxidized polyethylene 629A (Allied-Signal Inc., Morristown, N.J.), are suitable extrusion aids. These extrusion aids can also act as mold-release agents or additional mold release agents can be added to the composition.

Chain terminators are used to control molecular weight. Examples of chain terminators include monoalcohol compounds having 8 or more carbon atoms.

Light stabilizers prevent or reduce degradation of a polymer product due to visible or ultraviolet light. Examples of suitable light stabilizers include benzotriazole, such as Tinuvin P, and hindered amine light stabilizers, such as Tinuvin 770.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1 and Comparative Example 2

The TPUs made in this experiment were all made using the same general procedure. The procedure used involved heating a blend of hydroxyl terminated polyester intermediate, chain extender, and diisocyanate separately to about 150° C. and then mixing the ingredients. The reactions were exothermic and the temperature increased to within the range of about 200° C. to 250° C. in about 1 to 5 minutes, during which time polymerization took place as evidenced by an increase in viscosity. The hydroxyl terminated intermediate used in making the TPU in Example 1 was poly(1,3-propylene adipate) glycol and the hydroxyl terminated intermediate used in Comparative Example 2 was poly(1,4-butylene adipate) glycol. The chain extender used in making both polymers was 1,4-butane diol and the diisocyanate used in making both polymers was 4,4'-methylene bis-(phenyl isocyanate).

The thermoplastic polyurethane made in both Example 1 and Comparative Example 2 was extruded into sheets. The sheets were aged for a period of about 4 years. The sheet made in Example 1 was essentially bloom-free. However, the sheet made in Comparative Example 2 exhibited severe bloom. In fact, bloom was removed from the sheet made in Comparative Example 2 by rubbing the sheet with a fingertip. In any case, this experiment shows that bloom was essentially eliminated by utilizing poly(1,3-propylene adipate) glycol as the hydroxyl terminated polyester intermediate.

Examples 3-5 and Comparative Examples 6-7

The TPUs made in this series of experiments were all made using the same general procedure. The procedure used involved heating a blend of hydroxyl terminated polyester intermediate, chain extender, and diisocyanate separately to about 150° C. and then mixing the ingredients. The reactions were exothermic and the temperature increased to within the range of about 200° C. to 250° C. in about 1 to 5 minutes, during which time polymerization took place as evidenced by an increase in viscosity. The polyol and chain extender utilized in synthesizing these TPUs are identified in Table 1.

TABLE 1

|  | Example | | | | |
| --- | --- | --- | --- | --- | --- |
|  | 3 | 4 | 5 | 6 | 7 |
| Polyol | PDOA | PDOA | PDOA | BDOA | BDOA |
| Chain Extender | BDO | BDO | PDO | BDO | BDO |
| Shore A Hardness (ASTMD2240) | 79 | 85 | 86 | 75 | 85 |
| Tear Strength at Break (PSI)[1] | 6100 | 7600 | 7500 | 5500 | 7000 |
| Elongation (ASTM D412) | 510% | 540% | 555% | 680% | 550% |
| Trouser Tear Strength (lb/in)[2] | 105 | 135 | 165 | 100 | 130 |
| Bloom after 1 month | none | none | none | medium | slight |
| Bloom after 3 months | none | none | none | heavy | medium |
| Bloom after 9 months | none | none | none | — | — |

[1]ASTM D412
[2]ASTM D470
BDOA = poly(tetramethylene adipate) glycol
PDOA = poly(trimethylene adipate) glycol
BDO = 1,4-butanediol
PDO = 1,3-propanediol As can be seen from Table 1, the TPU samples made with poly(trimethylene adipate) glycol did not bloom. However, the samples made utilizing poly(tetramethylene adipate) glycol showed medium to heavy bloom after being aged for only 3 months.

While certain representative embodiments and details have been shown for the purpose of illustrating the subject invention, it will be apparent to those skilled in this art that various changes and modifications can be made therein without departing from the scope of the subject invention.

What is claimed is:

1. A method to reduce the tendency of a thermoplastic polyurethane polymer to bloom comprising making the thermoplastic polyurethane by the reaction of: (1) a hydroxyl terminated polyester intermediate, wherein the hydroxyl terminated intermediate is comprised of repeat units that are derived from 1,3-propylene glycol and adipic acid, and said hydroxyl terminated intermediate has a number average molecular weight which is within the range of 500 to 10,000 Daltons; (2) a diisocyanate of 4,4'-methylene bis-(phenyl isocyanate); and (3) a glycol chain extender, wherein 1,3-propylene glycol represents 70 to 95 weight percent of the glycol component used to synthesize the hydroxyl terminated polyester intermediate, and wherein the thermoplastic polyurethane polymer has a hardness ranging from Shore A 85 to Shore D 80.

* * * * *